US006334020B1

(12) United States Patent
Fujimori et al.

(10) Patent No.: US 6,334,020 B1
(45) Date of Patent: Dec. 25, 2001

(54) COMPACT PACKAGE STRUCTURE FOR FIBER OPTIC DEVICES

(75) Inventors: Brian J. Fujimori, Torrance; Andrew J. Bristol, Santa Monica; Thomas B. Mader, San Jose; Eric J. Shinaver, South Pasadena, all of CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/410,892

(22) Filed: Sep. 30, 1999

(51) Int. Cl.[7] ................................................ G02B 6/00

(52) U.S. Cl. ............................................ 385/134; 385/147

(58) Field of Search .............................. 385/134–137, 385/147

(56) References Cited

U.S. PATENT DOCUMENTS

| 5,185,843 | * | 2/1993  | Aberson et al. | 385/134 |
| 5,917,648 | * | 6/1999  | Harker         | 385/134 |
| 5,975,769 | * | 11/1999 | Larson et al.  | 385/134 |
| 6,072,931 | * | 6/2000  | Yoon et al.    | 385/135 |
| 6,144,792 | * | 11/2000 | Kim et al.     | 385/134 |

* cited by examiner

Primary Examiner—Akm E. Ullah

(57) ABSTRACT

A fiber-optic device package structure includes at least one, and typically several, optical stage subassemblies, and a housing in which each optical stage subassembly is received in a parallel, facing arrangement. Each optical stage subassembly has a thermnal/structural plate, an annular plurality of turns of a fiber-optic fiber supported on the thermal/structural plate, and a light connector to the fiber-optic fiber. Preferably, the annular plurality of turns is formed as a freestanding annulus of the plurality of turns of the fiber-optic fiber encapsulated within an encapsulant.

20 Claims, 4 Drawing Sheets

COMPACT PACKAGE STRUCTURE FOR FIBER OPTIC DEVICES

The invention described herein was made in the performance of work under government Contract No. WITHHELD/96-C-6293 awarded by the Government. The government has certain rights in this invention.

BACKGROUND OF THE INVENTION

This invention relates to fiber optics, and, more particularly, to a structure in which fiber-optic devices are packaged.

Fiber optic technology is based upon the propagation of light through relatively fine-diameter glass fibers. Generally, a fiber-optic fiber is formed of an optical glass core and a glass casing. Light travels through the core and is confined to the core by internal reflection from the glass casing. With this structure, light signals may be propagated over long distances with little loss of signal strength. In some fiber-optic fibers, a polymeric (e.g., acrylate) buffer layer overlies the core and casing to protect them.

As used herein, the term "fiber-optic fibers" encompasses macroscopic light-transparent fibers in which light is propagated, generated, or processed. Fiber-optic fibers include, for example, multimode, single-mode, polarization maintaining, and specialty-doped fibers, for applications such as, for example, laser, amplifier, and double-clad amplifier fibers. Fiber-optic fibers do not include integrated optical waveguides for the present purposes.

Fiber optics is used in a number of fields, such as communications and signal processing. In some of these applications, the fiber-optic fibers are utilized in an elongated form that may reach tens to hundreds of meters in length. Even with a protective buffer layer present, there is a concern that the fiber-optic fiber of this length may be damaged during assembly or service. Each fiber-optic fiber must therefore be packaged in a manner that does not damage the fiber-optic fiber by scratching, kinking, or the like, and does not stress the fiber-optic fiber by an unacceptably large amount. Either physical damage or excessive stresses may adversely influence the operation of the fiber-optic fiber.

There is a need for fiber-optic packaging structures which provide the fiber-optic fibers in a useful form and arrangement, while protecting the fibers.

The present invention fulfills this need, and further provides related advantages.

SUMMARY OF THE INVENTION

The present invention provides a fiber-optic device package structure that supports a fiber-optic fiber and, where needed for an application, a light-processing device optically connected to the fiber-optic fiber such as a coupler, a wavelength division multiplexer, an isolator, and/or a connector. The package structure is built in modular stage subassemblies that facilitate design, development, assembly, testing of the fiber-optic device, and repair and/or replacement of stages in which faults are found. Each stage subassembly accommodates a wide range of types, diameters, and lengths of fiber-optic fiber, without alteration of the basic stage design. When constructed of space-qualified materials, the package structure is fully qualified for space applications.

In accordance with the invention, a fiber-optic device package structure comprises at least one, and preferably several, optical stage subassemblies. Each optical stage subassembly comprises a thermal/structural plate, a plurality of turns of a fiber-optic fiber supported on the thermal/structural plate, and a light connector to the fiber-optic fiber. Desirably, the turns of the fiber-optic fiber are encapsulated within an encapsulant, such as a thermally conductive RTV epoxy or RTV silicone, to form a freestanding annulus. The package structure further includes a housing in which the optical stage subassemblies is received, so that the housing surrounds and encloses each optical stage subassembly.

There may be additional fiber-optic fiber annuluses supported on each optical stage subassembly, and there may be multiple optical stage subassemblies. One or more of the optical stage subassemblies may have a light-processing device mounted to the optical stage subassembly, preferably within the periphery of the fiber-optic fiber annulus. Optical connections to the fiber-optic fibers are provided as necessary. The optical connections may extend to external fiber-optic fibers, other optical stage subassemblies, or the mounted devices. The present approach is highly flexible and may be used with a variety of different fiber-optic systems, because the modular design permits a wide range of applications, types of fiber-optical fibers, light-processing devices, and other components and arrangements. The various subsystems may be designed for assembly on individual optical stage subassemblies, facilitating repair or replacement.

The housing of the present invention protects the fiber-optical fiber structure and any optical devices and interconnections from physical and chemical damage, and may be made hermetic if desired. It also provides shielding to protect the interior structure from radiation damage.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
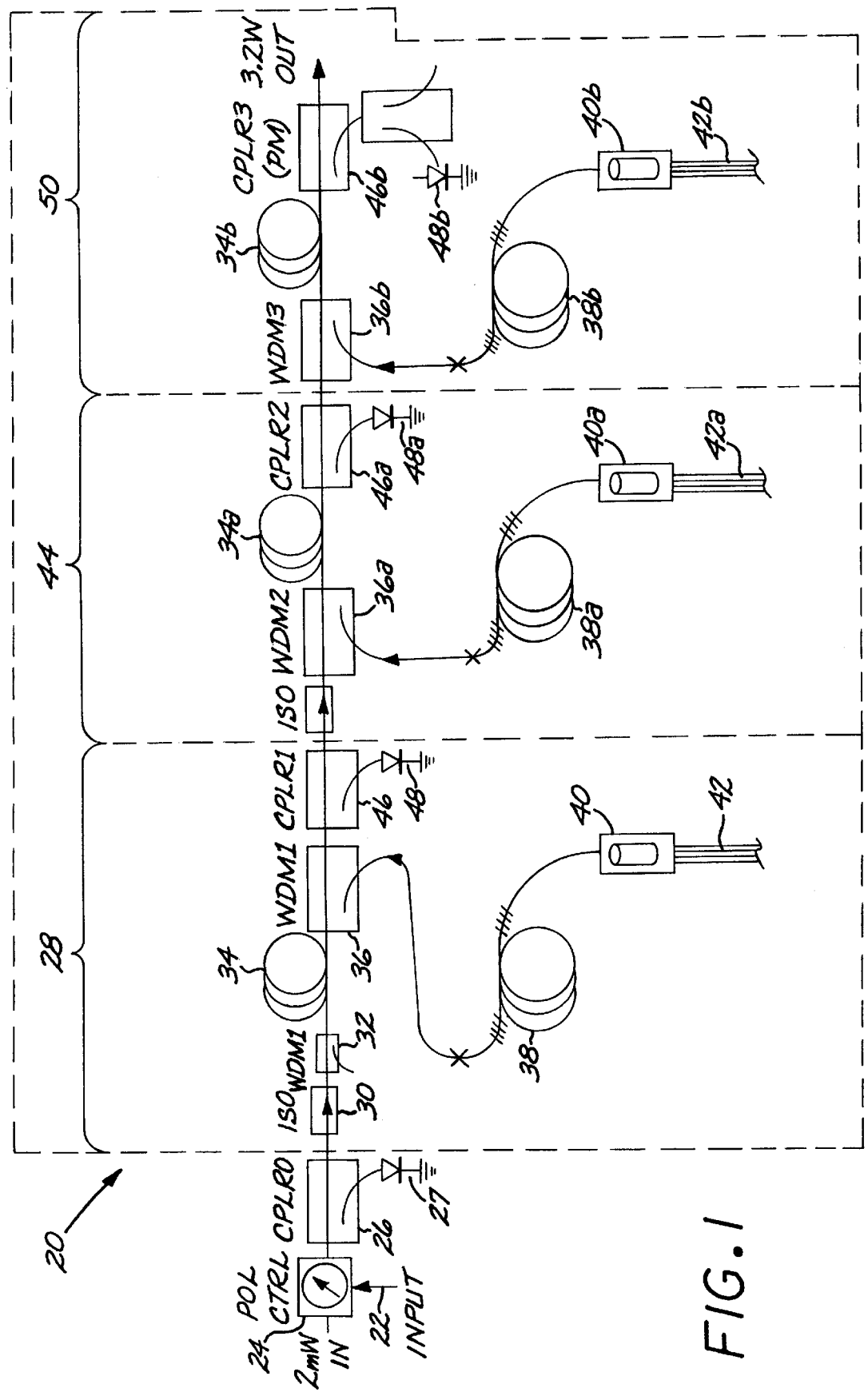
FIG. 1 is a pictorial block diagram of a fiber-optic device suitable for packaging using the approach of the invention.

FIG. 1 illustrates an optical amplifier 20 which may be packaged according to the approach of the invention. This optical amplifier 20 is used for illustrative purposes, and the package structure of the invention is not limited to this application.

The optical amplifier 20 includes a low-power input 22 to a polarization controller 24, whose output is provided to a coupler 26. The input power to the amplifier is measured by a power monitor 27.

From the coupler 26, the optical signal passes into a first stage 28 of the amplifier through an isolator 30 and a wavelength division multiplexer 32. The signal passes into an erbium:ytterbium-doped amplifier fiber 34, which is typically about 30 meters long. The output of the amplifier fiber 34 is multiplexed by a wavelength division multiplexer 36 with the output of a ytterbium-doped double clad laser fiber 38, which in turn is driven through an optical transition 40 by a fiber bundle 42 of laser diode fibers. The double clad laser fiber 38 is typically about 30 meters long. The output of the first stage 28 is passed to a second stage 44 through a coupler 46. Power output of the first stage 28 is monitored by a power monitor 48.

The second stage 44 of the amplifier has a structure similar to that of the first stage 28. In FIG. 1, corresponding elements of the second stage 44 are similarly numbered to those of the first stage, with suffix "a", and the prior description is incorporated here. The output of the second stage 44 is passed to a third stage 50 through a coupler 46a.

The third stage 50 of the amplifier has a structure similar to that of the first stage 28 and the second stage 44. In FIG. 1, corresponding elements of the third stage 50 are similarly numbered to those of the first stage, with suffix "b", and the prior description is incorporated here. The output of the third stage 50, amplified by three orders of magnitude from the input 22, is available for further use.

This amplifier 20 is readily packaged using the approach of the invention. It includes three stages 28, 44, and 50. In each stage, there is at least one, and in this case two fiber-optical fiber runs 34 and 38. In each stage, there are also a number of light-processing devices, such as the isolators 30, multiplexers 32 and 36, and power monitors 48. These elements may be easily damaged, and therefore it is desirable to enclose them in a package structure.

Figure 2:
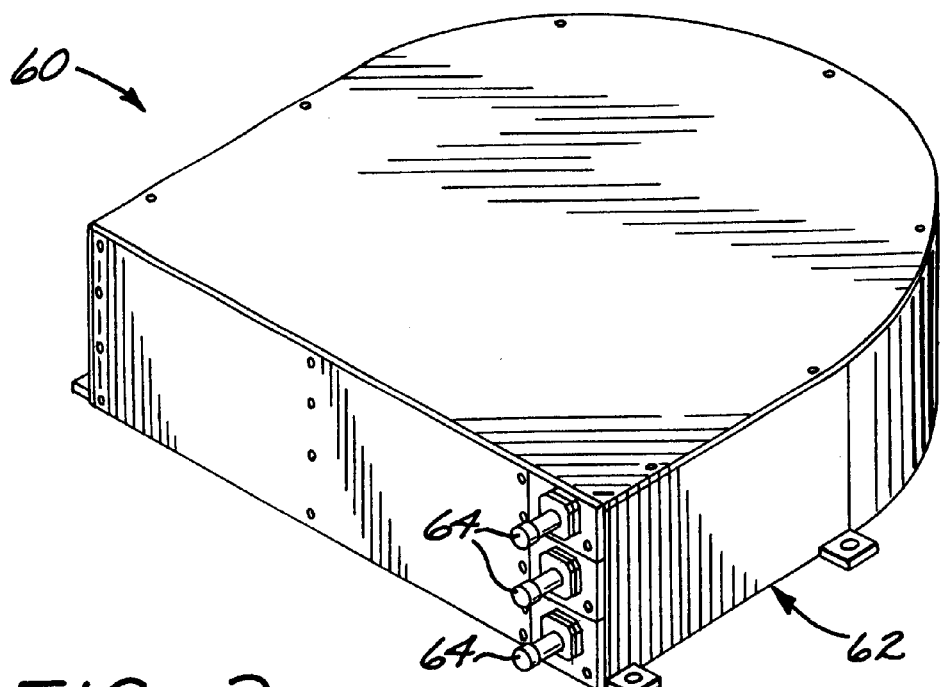
FIG. 2 is an exterior perspective view of a preferred package structure.

FIG. 2 depicts a package structure 60 suitable for use with the optical amplifier 20 and with other operable devices. The package structure 60 includes a housing 62 which surrounds and encloses the optical stages 28, 44, and 50, and external optical connectors 64.

Figure 3:
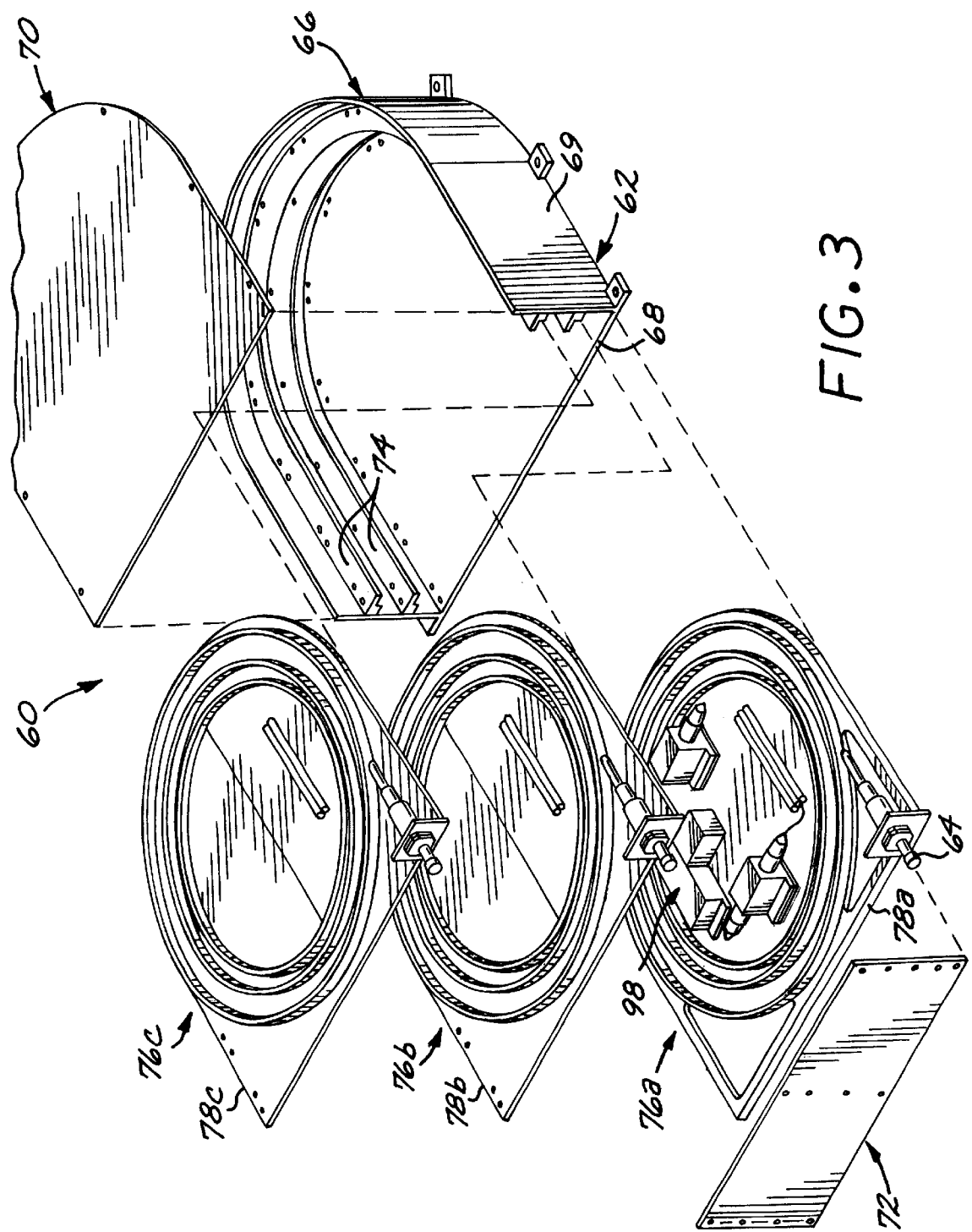
FIG. 3 is an exploded view of the package structure of FIG. 2.

FIG. 3 is an exploded view of the package structure 60 of FIG. 2. The housing 62 in this case includes a one-piece chassis 66 having an integral bottom 68 and an integral side wall 69. There are a cover 70 and a front plate 72 for the chassis 66. Integral within the chassis 66 are support flanges 74 extending around the interior of the side wall 69 of the chassis 66. The support flanges 74 are positioned and sized to support a planar article in a slide-in fashion. In this case, there are two such support flanges 74. The housing 62 is preferably made of aluminum.

Three stage subassemblies 76a–76c are received in a sliding fashion into the interior of the chassis 66. A first stage subassembly 76a rests on the bottom 68 of the housing 62. The two additional stage subassemblies 76b and 76c rest on the respective support flanges 74. To assemble the stage subassemblies to the chassis, the front plate 72 is removed, the stage subassemblies 76 are slid into place, and the front plate 72 is replaced. Each of the stage subassemblies 76 has an external connection 64.

Each of the stage subassemblies 76 supports the components of a respective one of the stages 28, 44, and 50, and the three stage subassemblies 76 therefore have a similar structural architecture. That is, the general arrangement of optical elements is similar, but the optical elements themselves need not be the same or even similar. One of the stage subassemblies will be described in detail, and it is understood that the other stage subassemblies have substantially the same arrangements.

Figure 5:
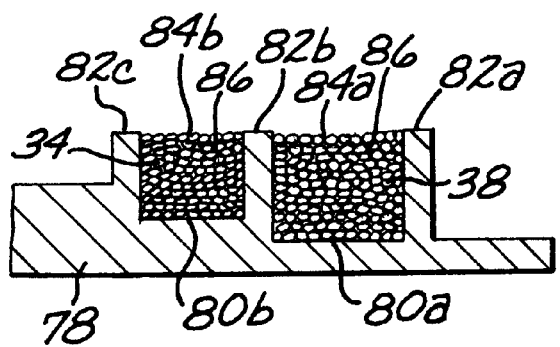
FIG. 5 is a schematic sectional view of a fiber-optic stage subassembly.
Figure 4:
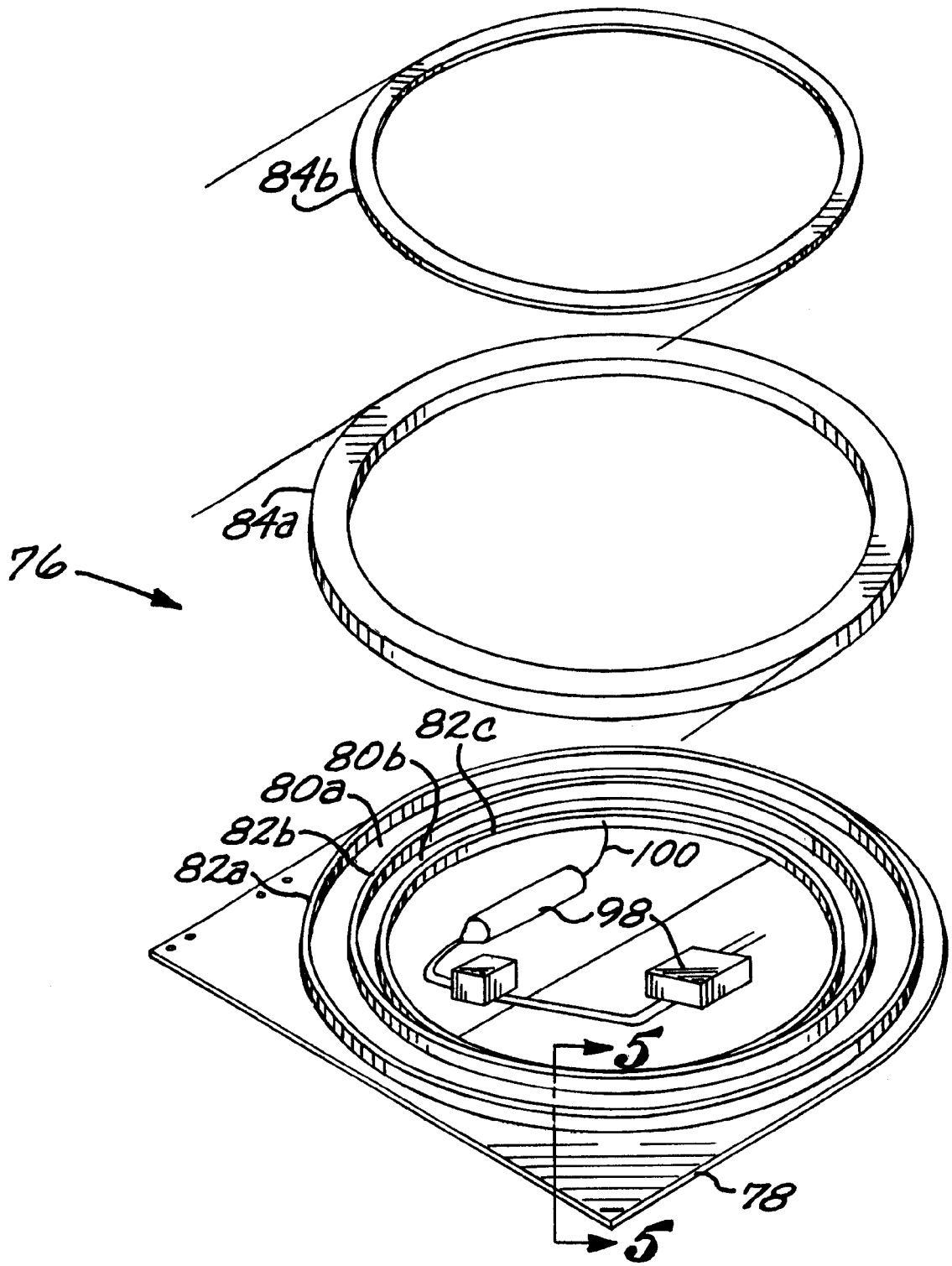
FIG. 4 is an exploded view of one of the stages of the package structure of FIG. 3.

One of the stage subassemblies 76 is shown in exploded perspective view in FIG. 4 and in partial section in FIG. 5 prior to the exploding of the view. The stage subassembly 76 includes a thermnal/structural plate 78, preferably made of aluminum to aid in dissipating heat. The thermal/structural plate 78 has a flat bottom in the case of the thermal-structural plate 78a used in the lowermost of the stage subassemblies 76a to rest on the interior side of the bottom 68 of the housing 62. The thermal/structural plate 78 is sized to rest on the respective support flanges 74 in the case of the thermal/structural plates 78b and 78c used in the two upper stage subassemblies 76b and 76c. The three structural plates 78a, 78b, and 78c are thereby positioned in a parallel, facing but spaced-apart orientation, as illustrated, when assembled in the housing 62.

Two circular (when viewed in plan view) tracks 80a and 80b are formed on a top side of the thermal/structural plate 78. The tracks 80a and 80b are formed by three circular walls 82a–82c, with the middle wall 82b shared in this case. The first circular track 80a is of larger circular diameter than the second circular track 80b. A first fiber-optic annulus 84a is sized to fit within the first track 80a by sliding downwardly between its walls 82a and 82b. A second fiber-optic annulus 84b is sized to fit within the first track 80b by sliding downwardly between its walls 82b and 82c. That is, the second fiber-optic annulus 84b is smaller in circular diameter than the first fiber-optic annulus 84a. In the illustrated embodiment associated with the optical amplifier 20 of FIG. 1, the first fiber-optic annulus 84a includes the a plurality of turns of the laser fiber 38, and the second fiber-optic annulus 84b includes a plurality of turns of the amplifier fiber 34.

The fiber-optical fibers 34 and 38 are encapsulated within an encapsulant 86, preferably an epoxy or a silicone, to form the respective annuluses 84a and 84b. Each of the annuluses 84a and 84b is preferably prepared as a freestanding annulus, by winding the plurality of turns of the optical fibers around a form, infiltrating the wound array with the encapsulant in a liquid, uncured form, and curing the encapsulant. The optical fibers that are enclosed in the annuluses 84a and 84b are thereby fully protected and readily handled during assembly into the stage subassembly 76. The annuluses 84a and 84b may instead be prepared by winding the fiber-optical fiber into the respective track and then adding the liquid encapsulant. This latter approach is less preferred.

Typically, there are multiple turns of the fiber-optic fiber in each of the annuluses, so that a long length of the fiber-optic fiber is captured within a small volume. For any fiber-optic fiber, the minimum permissible bend diameter is defined by several factors, including the diameter of the fiber-optic fiber and its material of construction. The circular diameter of each track 80 is selected to be larger than the minimum permissible bend diameter of the fiber-optic fiber that constitutes the respective annulus 84. The encapsulant holds the fiber-optic fiber in place without significant applied stresses. The fiber-optic fiber is held rigidly without vibrations due to mechanical shocks. For those applications, such as the optical amplifier 20, where there is substantial heat production in the fiber-optic fiber, the encapsulant 86 is selected to have a good thermal conductivity so as to conduct away the heat produced in the fiber-optic fiber. An acceptable encapsulant 86 with good thermal conductivity is RTV epoxy or RTV silicone.

In the preferred embodiment of the package structure 60 designed for use with the optical amplifier 20, there are two annuluses 84a and 84b. More or fewer annuluses may be used, depending upon the requirements of the device contained within the package structure.

As shown in FIGS. 3 and 4, light-processing devices 98 are desirably mounted with an adhesive or with mechanical fasteners to the thermal/structural plate 78, interior of the innermost track 80b. The light-processing devices 98 include those discrete components, other than the fiber-optic fibers, required in the optical amplifier 20 or other optical device. Optical interconnections (splices) 100 are provided as necessary between the fiber-optic fibers and the light-processing devices 98. The thermal-structural plate 78 serves as a heat sink to conduct heat away from the fiber-optic fiber wound in the annulus 84, and also from the light-processing devices 98 mounted onto the plate 78.

For some applications, the package structure 60 and the optical amplifier 20 are all space qualified materials, and the assembly is made by space-qualified processes. That is, the components and the assembly must meet all applicable standards for space hardware, such as temperature capability, low outgassing, and operability during and after vibration, as provided in ASTM E595. The glass, semiconductor, and metallic components meet these standards, if assembled using accepted procedures. Any organic components, such as the encapsulant 86, are selected to be space qualified. Numerous space-qualified organic compounds are known, including the preferred RTV epoxy and RTV silicone.

A single stage subassembly was constructed to test the operability of the invention. A single annulus was wrapped with 24 meters of erbium-doped optical fiber, and a signal was passed through the optical fiber. The subassembly was cycled eight times over a temperature range of −15° C. to +55° C., with a ramp rate of 4° C. per minute and a dwell time at each of the upper and lower temperatures of 30 minutes. No degradation of signal performance was observed.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A fiber-optic device package structure, comprising:
   at least one optical stage subassembly, each optical stage subassembly comprising
      a thermal/structural plate,
      a plurality of turns of a fiber-optic fiber supported on the thermal/structural plate,
      an encapsulant surrounding the turns of the fiber-optic fiber, and
      a light connector to the fiber-optic fiber; and
   a housing in which the at least one optical stage subassembly is received, the housing surrounding and enclosing each optical stage subassembly.

2. The package structure of claim 1, wherein the at least one optical stage subassembly comprises
   at least two optical stage subassemblies.

3. The package structure of claim 1, further including
   a light-processing device mounted to the thermal-structural plate within a periphery of the optical stage subassembly, and
   an interconnection between the fiber-optic fiber and the light-processing device.

4. The package structure of claim 1, wherein the fiber-optic fiber is formed as a freestanding annulus comprising the plurality of turns of the fiber-optic fiber encapsulated within the encapsulant.

5. The package structure of claim 1, wherein the housing comprises
   a chassis, a cover, and a front plate.

6. The package structure of claim 1, wherein the at least one optical stage subassembly is slidably received into the housing.

7. A fiber-optic device package structure, comprising:
   a first optical stage subassembly and a second optical stage subassembly, each optical stage subassembly comprising
      a thermal/structural plate,
      an annular plurality of turns of a fiber-optic fiber supported on the thermal/structural plate, and
      a light connector to the fiber-optic fiber; and
   a housing in which the first optical stage subassembly and the second optical stage subassembly are received in a parallel, facing arrangement, the housing having a side wall and a support flange extending inwardly from the side wall with one of the optical stage subassemblies being received on the support flange, the housing surrounding and enclosing the first optical stage subassembly and the second optical stage subassembly.

8. The package structure of claim 7, further including
   an encapsulant surrounding the fiber-optic fiber.

9. The package structure of claim 7, wherein the fiber-optic fiber is formed as a freestanding annulus comprising a plurality of turns of the fiber-optic fiber encapsulated within an encapsulant.

10. The package structure of claim 7, wherein at least one of the first optical stage subassemblies and the second optical stage subassemblies further comprises
   a second plurality of turns of a second fiber-optic fiber, the plurality of turns of the second fiber-optic fiber annulus having an annular diameter less than an annular diameter of the plurality of turns of the fiber-optic fiber.

11. The package structure of claim 7, further including
   a light-processing device mounted to the optical stage within a periphery of the fiber-optic stage subassembly, and
   an interconnection between the fiber-optic fiber and the light-processing device.

12. The package structure of claim 7, wherein the housing comprises
   a chassis, a cover, and a front plate.

13. The package structure of claim 7, wherein the first optical stage and the second optical stage are slidably received into the housing in a facing, parallel arrangement.

14. A fiber-optic device package structure, comprising:
   a first optical stage subassembly and a second optical stage subassembly, each optical stage subassembly comprising
      a thermal/structural plate,
      an annular plurality of turns of a fiber-optic fiber supported on the thermal/structural plate, wherein the annular plurality of turns is formed as a free-standing annulus comprising the plurality of turns of the fiber-optic fiber encapsulated within an encapsulant, and
      a light connector to the fiber-optic fiber,
      a light-processing device supported on the thermal/structural plate within a periphery of the annular plurality of turns, and
      an interconnection between the fiber-optic fiber and the light-processing device; and
   a housing in which the first optical stage subassembly and the second optical stage subassembly are received in a parallel, facing arrangement, the housing surrounding and enclosing the first optical stage subassembly and the second optical stage subassembly.

15. The package structure of claim 1, wherein the plurality of turns comprises a circular annulus.

16. The package structure of claim 1, wherein all materials used in the package structure are space qualified.

17. The package structure of claim 7, wherein the plurality of turns comprises a circular annulus.

18. The package structure of claim 7, wherein all materials used in the package structure are space qualified.

19. The package structure of claim 14, wherein the plurality of turns comprises a circular annulus.

20. The package structure of claim 14, wherein all materials used in the package structure are space qualified.

* * * * *